US008206117B2

(12) United States Patent
Strangman et al.

(10) Patent No.: US 8,206,117 B2
(45) Date of Patent: Jun. 26, 2012

(54) TURBINE COMPONENTS AND METHODS OF MANUFACTURING TURBINE COMPONENTS

(75) Inventors: Thomas E. Strangman, Prescott, AZ (US); Vladimir K. Tolpygo, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1438 days.

(21) Appl. No.: 11/960,099

(22) Filed: Dec. 19, 2007

(65) Prior Publication Data

US 2009/0162205 A1 Jun. 25, 2009

(51) Int. Cl.
*F01D 5/34* (2006.01)

(52) U.S. Cl. .............. 416/219 R; 416/244 A; 29/889.21

(58) Field of Classification Search .............. 416/244 A, 416/213 R, 219 R; 29/889.2, 889.21
See application file for complete search history.

(56) References Cited

U.S. PATENT DOCUMENTS 2,922,619 A * 1/1960 Slemmons ................ 416/244 A
4,096,615 A 6/1978 Cross
4,270,256 A 6/1981 Ewing
4,529,452 A 7/1985 Walker
5,273,708 A 12/1993 Freeman
5,540,790 A 7/1996 Erickson
6,164,917 A 12/2000 Frasier et al.
6,331,217 B1 12/2001 Burke et al.
6,632,299 B1 10/2003 Harris
6,709,771 B2 3/2004 Allister
6,800,148 B2 10/2004 Fraiser et al.
6,969,240 B2 * 11/2005 Strangman .................... 416/234
7,011,721 B2 3/2006 Harris et al.
2005/0025613 A1 2/2005 Strangman

* cited by examiner

*Primary Examiner* — Richard Edgar

(74) *Attorney, Agent, or Firm* — Ingrassia Fisher & Lorenz, P.C.

(57) ABSTRACT

Turbine components are provided. In an embodiment, by way of example, a hub and a ring are included. The hub comprises a first material. The ring is bonded to the hub. The ring comprises a plurality of arc segments forming a ring, each arc segment comprising a second material comprising a single crystal superalloy material having a predetermined primary orientation and a predetermined secondary orientation, each predetermined primary orientation of each arc segment being substantially equal, and each predetermined secondary orientation of each arc segment being substantially equal, each arc segment adjacent another arc segment, and the adjacent arc segments having a predetermined crystallographic mismatch therebetween. Methods of manufacturing are also provided.

19 Claims, 5 Drawing Sheets

TURBINE COMPONENTS AND METHODS OF MANUFACTURING TURBINE COMPONENTS

TECHNICAL FIELD

The inventive subject matter generally relates to turbine components, and more particularly relates to turbine disks and methods of manufacturing turbine components.

BACKGROUND

Turbine disks are typically employed in gas turbine engines. In some cases, the turbine disk may be made of a superalloy material comprised of superalloy powder that has been consolidated by a powder metallurgy process into billets and forged into fine-grained disks. Slots may be machined into an outer periphery of the disk to receive turbine blades. The turbine blades may be individually cast and machined with firtree attachments that enable them to be inserted into the machined slots. Typically, the turbine disk can tolerate disk rim temperatures of up to about 675° C., while the turbine blades may tolerate higher temperatures.

Although the aforementioned powder metallurgy turbine disks operate adequately, they may be improved. In particular, creep and sustained peak low cycle fatigue cracking may occur at grain boundaries when the disk rim temperature exceeds about 675° C. As a result, the useful life of powder metallurgy turbine disks may be limited.

Hence, it would be desirable to have an improved turbine disk and/or other turbine engine components that can operate reliably when disk rim temperatures exceed 675° C. Moreover, it is desirable to have a method of manufacturing that minimizes manufacturing costs. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods are provided for manufacturing turbine components.

In an embodiment, by way of example only, the method includes forming a plurality of arc segments, each arc segment comprising a single crystal material having a predetermined primary orientation and a predetermined secondary orientation, each predetermined primary orientation of each arc segment being substantially equal, and each predetermined secondary orientation of each arc segment being substantially equal, bonding the plurality of arc segments together into a ring such that each arc segment is adjacent another arc segment, the adjacent arc segments have a bond line therebetween, and the adjacent arc segments have a predetermined crystallographic mismatch therebetween, bonding the ring to a hub to form a disk, and machining the disk to remove at least a portion of the bond line between adjacent arc segments to thereby form a slot in the disk to form the turbine component.

In another embodiment, by way of example only, the method includes integrally casting a ring having a plurality of arc segments grown from a plurality of seed crystals, each arc segment comprising a single crystal material having a predetermined primary orientation and a predetermined secondary orientation, each predetermined primary orientation of each arc segment being substantially equal, and each predetermined secondary orientation of each arc segment being substantially equal, each arc segment adjacent another arc segment and having a bond line therebetween, and the adjacent arc segments having a predetermined crystallographic mismatch therebetween, bonding the ring to a hub to form a disk, and machining the disk to remove at least a portion of the bond line between adjacent arc segments to thereby form a slot in the disk to form the turbine component.

Turbine components are also provided. In an embodiment, by way of example, a hub and a ring are provided. The hub comprises a first material. The ring is bonded to the hub and comprises a plurality of arc segments. Each arc segment comprises a second material comprising a single crystal material having a predetermined primary orientation and a predetermined secondary orientation, each predetermined primary orientation of each arc segment being substantially equal, and each predetermined secondary orientation of each arc segment being substantially equal, each arc segment adjacent another arc segment, and the adjacent arc segments having a predetermined crystallographic mismatch therebetween.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
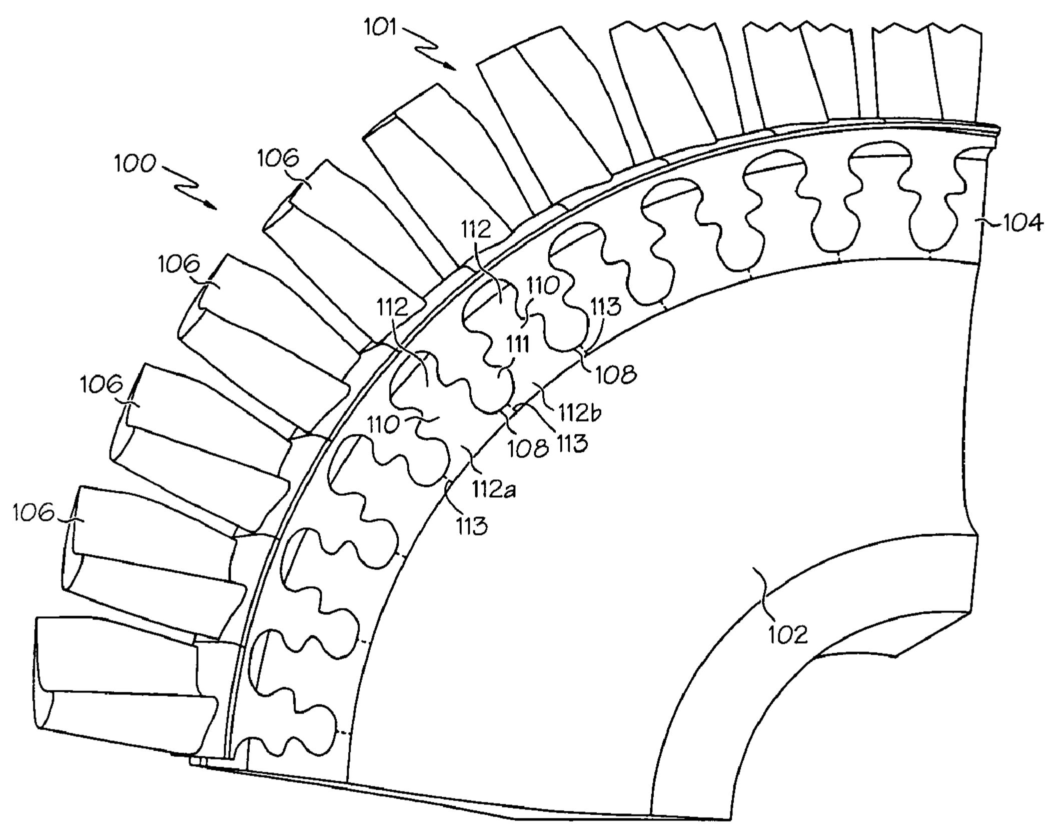
FIG. 1 is a close up view of a portion of a bladed disk, according to an embodiment.

FIG. 1 is a perspective view of a portion of the bladed disk 100, according to an embodiment. The bladed disk 100 may be comprised of a hub 102, a ring 104, and a plurality of blades or airfoils 106. The hub 102 may be configured to mount to a rotatable shaft (not shown) and to withstand temperatures that may be below about 675° C. In an embodiment, the hub 102 may comprise a first material capable of withstanding such temperatures, and, in this regard, may be made up of a suitable superalloy material. Suitable superalloy materials include, but are not limited to, powder metallurgy nickel-based superalloys, such as Alloy 10. In an embodiment, the hub is made up of a superalloy having substantially similarly sized grains in three dimensions; thus, the hub may be made up of equiaxed superalloy material.

The ring 104 surrounds the hub 102 and may be bonded thereto. For example, the ring 104 may be diffusion bonded to the hub 102. The ring 104 also includes a plurality of slots 108 that are machined into its outer periphery. The slots 108 define a plurality of posts 110 therebetween and are configured to receive corresponding attachment portions 111 of the blades 106 therein. In an embodiment, the ring 104 may have between twenty-four (24) to forty-eight (48) equally spaced slots 108, and each slot 108 may include a corresponding blade 106. In other embodiments, more or fewer slots 108 and blades 106 may alternatively be incorporated.

The ring 104 and the blades 106 may be configured to exhibit different properties than the hub 102. For example, the ring 104 and the blades 106 may have compositions and microstructures configured to withstand temperatures that are higher than those to which the hub 102 may be exposed. In one embodiment, the ring 104 may be capable of withstanding temperatures in a range of between about 675° C. and about 815° C., and the blades 106 may be capable of withstanding temperatures in a range of between about 675° C. and about 1150° C. In this regard, at least the ring 104 may be made of a plurality of arc segments 112 (the boundaries (referred to as "grain boundaries" or "bond lines" below) of which are indicated by dotted lines 113) that each comprise single crystal material, where the single crystal material is configured to have a predetermined crystallographic orientation.

As used herein, the phrase "single crystal" may refer to a material in which substantially all of the material has a single crystallographic orientation, without the presence of high angle grain boundaries (e.g., greater than about 15 degrees). A small amount of low angle grain boundaries (e.g., less than about 15 degrees), such as tilt or twist boundaries, may be present in the single crystal material. Other minor irregularities are also permitted within the scope of the term "single crystal." For example, small areas of high angle grain boundaries may be formed due to the inability of the single crystal to grow perfectly. Such deviations from a perfect single crystal, which are found in normal commercial production operations, may be within the scope of the term "single crystal" as used herein.

In an embodiment, low-angle grain boundaries 113 may exist between adjacent arc segments. A low-angle grain boundary 113 may be defined as an amount of misorientation that adjacent arc segments can tolerate without a significant reduction in mechanical properties, such as creep life. Using this criterion, low-angle grain boundaries in commercial single crystal superalloys range between about 8 degrees to about 18 degrees.

In any case, the ring 104 may be made of any one of numerous materials capable of forming single crystal materials. For example, when low-angle grain boundaries 113 will exist between adjacent arc segments 112*a*, 112*b* suitable single crystal materials including investment cast nickel superalloys that contains a concentration of one or more grain boundary strengthening elements (Hf, C, B, Zr) that is sufficient to substantially avoid a stress-rupture debit may be used. An example of a suitable material for such case is a single crystal material comprising nickel-based CMSX-486® superalloy, as manufactured by the Cannon-Muskegon Corporation of Muskegon, Mich. CMSX-486® superalloy may be comprised of about 61.41 weight percent nickel, about 9.3 weight percent cobalt, about 4.8 weight percent chromium, about 8.6 weight percent tungsten, about 4.5 weight percent tantalum, about 0.7 weight percent molybdenum, about 3.0 percent rhenium, about 5.7 weight percent aluminum, about 0.7 weight percent titanium, about 1.2 weight percent hafnium, about 0.07 weight percent carbon, about 0.015 weight percent boron, and about 0.005 weight percent zirconium. This single crystal alloy can tolerate low-angle grain boundaries up to about 18 degrees.

Single crystal superalloys with fewer grain boundary strengthening elements than the nickel-based CMSX-486® superalloy may be used when adjacent arc segments are bonded by transient liquid phase brazing, or by placing or casting an equiaxed superalloy layer comprising grain boundary strengthening elements in the gaps between adjacent arc segments. Suitable single crystal superalloys for the arc segments include SC180, available through Honeywell International, Inc. of Morristown, N.J. The composition of SC180 may be comprised of about 60.45 weight percent nickel, about 10.0 weight percent cobalt, about 5.0 weight percent chromium, about 5.0 weight percent tungsten, about 8.5 weight percent tantalum, about 1.7 weight percent molybdenum, about 3.0 percent rhenium, about 5.5 weight percent aluminum, about 0.75 weight percent titanium, and about 0.1 weight percent hafnium. Suitable materials for the equiaxed superalloy layer include MarM247, the nominal composition of which includes about 59.835 weight percent nickel, about 10.0 weight percent cobalt, about 8.25 weight percent chromium, about 10.0 weight percent tungsten, about 3.0 weight percent tantalum, about 0.7 weight percent molybdenum, about 5.5 weight percent aluminum, about 1.0 weight percent titanium, about 1.5 weight percent hafnium, about 0.15 weight percent carbon, about 0.015 weight percent boron, and about 0.05 weight percent zirconium. A film of a melting point depressant such as boron or silicon, which may facilitate wetting and bonding of equiaxed superalloy foil and adjacent arc segments may alternatively be used.

As briefly mentioned above, the plurality of arc segments 112 making up the ring 104 each has a predetermined crystallographic orientation. In particular, each arc segment 112 may have a predetermined primary orientation and a predetermined secondary orientation. In an embodiment, the predetermined primary orientation of each arc segment may be substantially equal, and each predetermined secondary orientation of each arc segment may be substantially equal, where the predetermined primary orientation may be a radial orientation and the secondary orientation may be a circumferential orientation, for example. In an embodiment, grain boundaries 113 that are oriented perpendicular to the radial orientation of the ring 104 may be substantially absent within individual arc segments. In such case, the absence of grain boundaries may inhibit creep and sustained peak low cycle fatigue crack propagation in the disk posts 110, when the bladed disk 100 operates at temperatures in a range of between about 675° C. and about 815° C.

Figure 2:
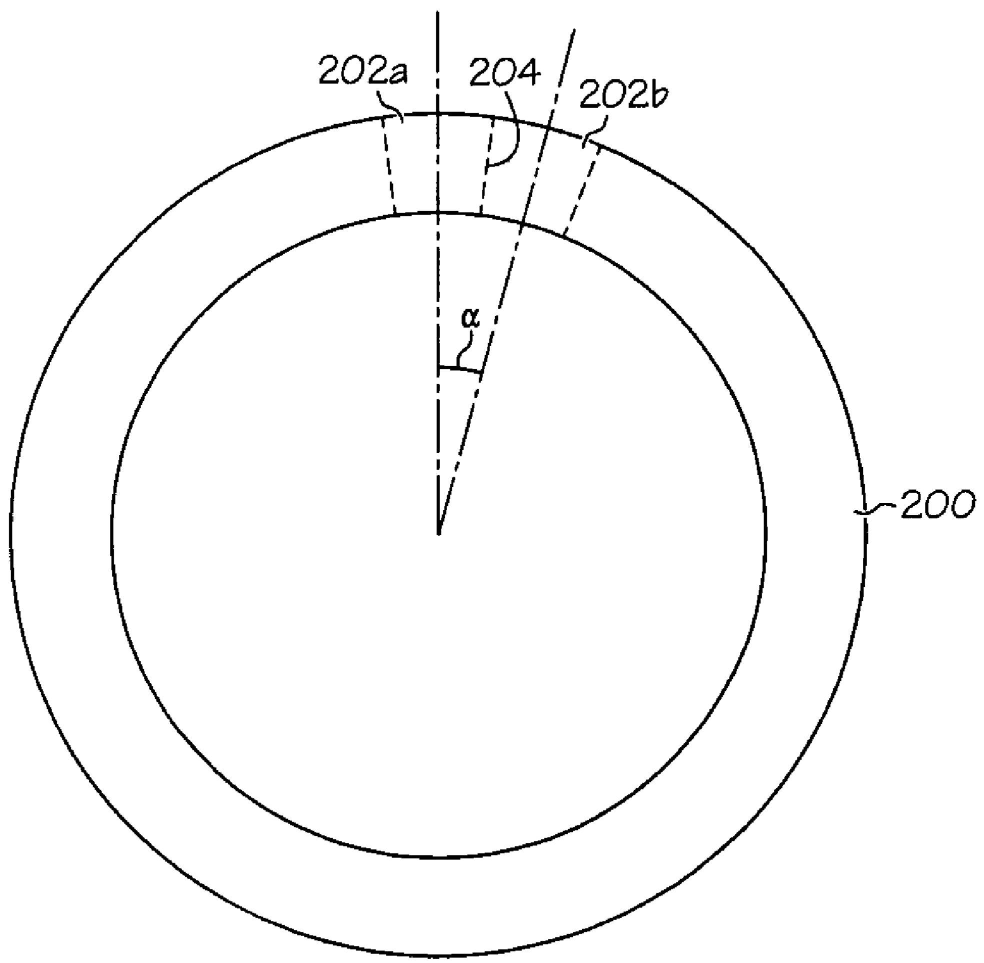
FIG. 2 is a close up view of a portion of a ring of the disk, according to an embodiment.

As shown in FIG. 1, when disposed in the ring 104, each arc segment 112*a* is adjacent another arc segment 112*b*. In an embodiment, the adjacent arc segments 112*a*, 112*b* have a crystallographic mismatch therebetween. FIG. 2 is a close up view of a simplified ring 200, according to an embodiment. The ring 200 has adjacent arc segments 202*a*, 202*b*, a grain boundary 204, and an angle $\alpha$ between the arc segments 202*a*, 202*b*. A crystallographic mismatch may be defined as the angle $\alpha$ between the adjacent arc segments 202*a*, 202*b*.

Returning to FIG. 1, a particular angle of crystallographic mismatch may depend on a number of arc segments 112 that make up the ring 104, and a resulting angle of crystallographic mismatch between two adjacent arc segments 112*a*, 112*b* may be determined by dividing 360° by n, where n is the total number of arc segments or slots in the ring 104, in an embodiment. Thus, in an example where thirty six (36) arc segments 112 are included, 360° is divided by 36 to yield an angle of crystallographic mismatch of 10° between the arc segments 112. In other embodiments, more arc segments may be included and the angle of crystallographic mismatch may be less. In still other embodiments, fewer arc segments may be included and the angle of crystallographic mismatch may be greater. In any case, variations between the angles of crystallographic mismatch between adjacent arc segments 112 may vary by about ±3°.

Similar to the ring 104, each blade 106 may be made of a material having a predetermined primary orientation and a predetermined secondary orientation. In an embodiment, the predetermined primary and secondary orientation of a blade 106 may be substantially equal to the predetermined primary and secondary orientation of an adjacent portion of the ring 104 (e.g., arc segment 112 or corresponding posts 110), where the predetermined primary orientation is a radial orientation and the secondary orientation is a circumferential orientation.

The blades 106 may be made of any one of numerous materials capable of being configured to exhibit the aforementioned properties. Examples of suitable materials include, but are not limited to, nickel-based alloys, such SC180.

Figure 3:
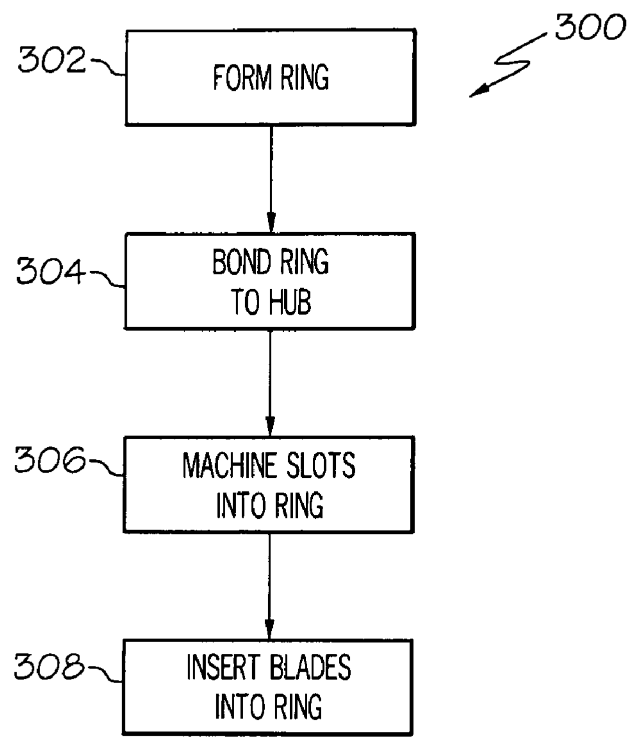
FIG. 3 is a method of manufacturing a bladed disk, according to an embodiment.

To manufacture the above-described bladed disk 100, a method 300 shown in FIG. 3 may be employed. According to an embodiment, a ring is first formed, step 302. The ring is bonded to a hub to form a disk, step 304. Slots are machined into the disk, step 306. Then, blades are inserted into the disk to form a turbine component, step 308. Each of these steps will now be discussed in more detail below.

Figure 4:
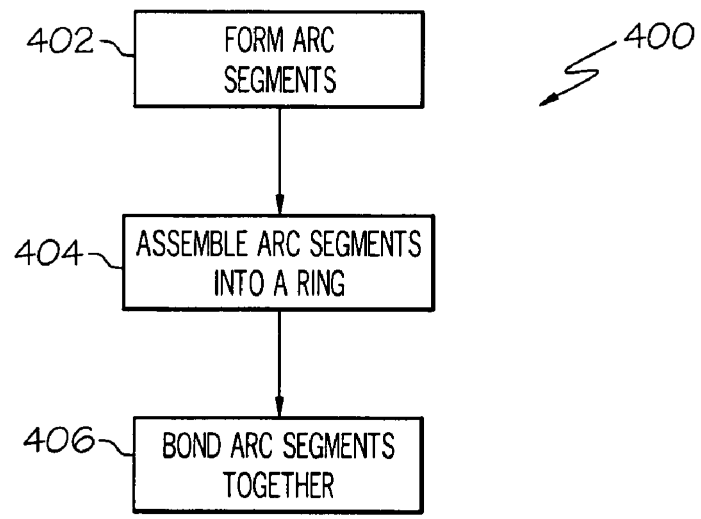
FIG. 4 is a method for forming a bonded ring for a rim of the disk from a plurality of arc segments, according to an embodiment.

As mentioned briefly above, the ring is first formed, step 302. One example of forming the ring includes forming the ring from a plurality of individual arc segments, as depicted in a method 400 in FIG. 4. In this embodiment, the method 400 includes forming the individual arc segments, step 402. In an embodiment, the individual arc segments may be formed by investment casting single crystal superalloy material into single crystal arc segments. The arc segments may then be solution heat treated (to improve creep strength) and inspected for desired primary and secondary orientations. Subsequently, surfaces of the arc segments may be machined in preparation for bonding.

The individual arc segments are assembled into a ring, step 404, and bonded together, step 406. The bonded ring forms a full ring comprising a plurality of arc segments having bond lines therebetween. To this end, the arc segments may be placed in a bonding fixture and bonded together using any known bonding method. In an embodiment, the arc segments may be bonded together by diffusion bonding with the aid of a differential thermal expansion tooling. The tooling may comprise a low alpha Mo tooling, or any other suitable tooling. In another embodiment, conventional brazing may be used to bond the arc segments together.

In still another embodiment, the arc segments may be bonded by a transient liquid phase bonding process. In one particular example, a transient liquid phase material is deposited on the bonding surfaces of each arc segment. The transient liquid phase material includes melting point depressants and is formulated to melt at a temperature below the incipient melting temperature of the single crystal material making up the arc segments. The transient liquid phase material may be applied to the bonding surfaces in any suitable manner. For example, the material may be sputtered onto the bonding surface In another example, the material may be inserted between two bonding surfaces as a superalloy foil, where the superalloy foil includes the transient liquid phase material, which may comprise the melting point depressant and nickel or a nickel-base alloy. In any case, the transient liquid phase material may be applied to a thickness, such as between about 0.05 microns and 50 microns. In other embodiments, more or less may be alternatively applied. The arc segments are then loaded into a tooling. In an embodiment, the tooling may be thermal expansion tooling. In another embodiment, the tooling may be adapted to place the bonding surfaces of adjacent arc segments into compression. Heat is then applied to the arc segments to thereby melt the depressant. In particular, the melting point depressants in the transient liquid phase material diffuse out of the liquid phase into the adjacent single crystal to thereby raise the melting temperature of the bonded joint. In an embodiment, in which a thermal expansion tooling is used, the tooling may compress the ring of arc segments, which may extrude excess transient liquid phase material from bond joints prior to solidification. The ring may be heated using a furnace or other heating device.

In still yet other embodiments, bonding may be accomplished by casting or injecting a molten bonding alloy into gaps between adjacent arc segments. For example, first, the arc segments may be arranged into a ring in an investment casting mold. In an embodiment, all of the arc segments may be preheated to a temperature of between about 1100° C.±100° C., while subjected to a vacuum or an inert gas environment. Alternatively, the arc segments may be assembled into a ring assembly fixture that limits heating to at least two adjacent arc segments. In any case, a bonding alloy, such as MarM247, may then be cast into the gaps between adjacent arc segments. In an embodiment in which the bonding alloy is cast between two adjacent preheated arc segments, the other arc segments remain relatively cold. This process can be repeated until the entire ring has been bonded.

Figure 5:
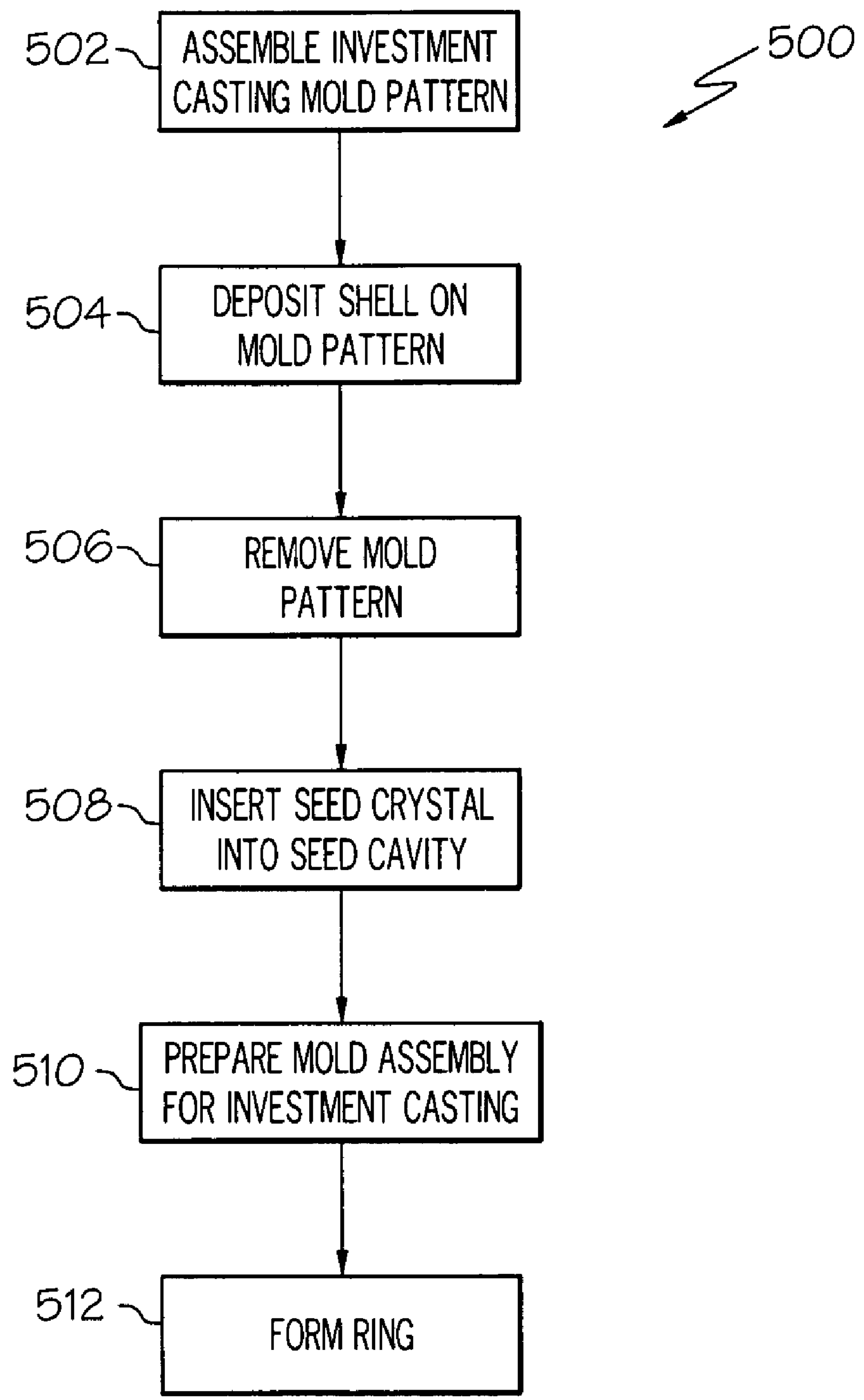
FIG. 5 is a method for forming an integral ring for a rim of the disk, according to an embodiment.
Figure 6:
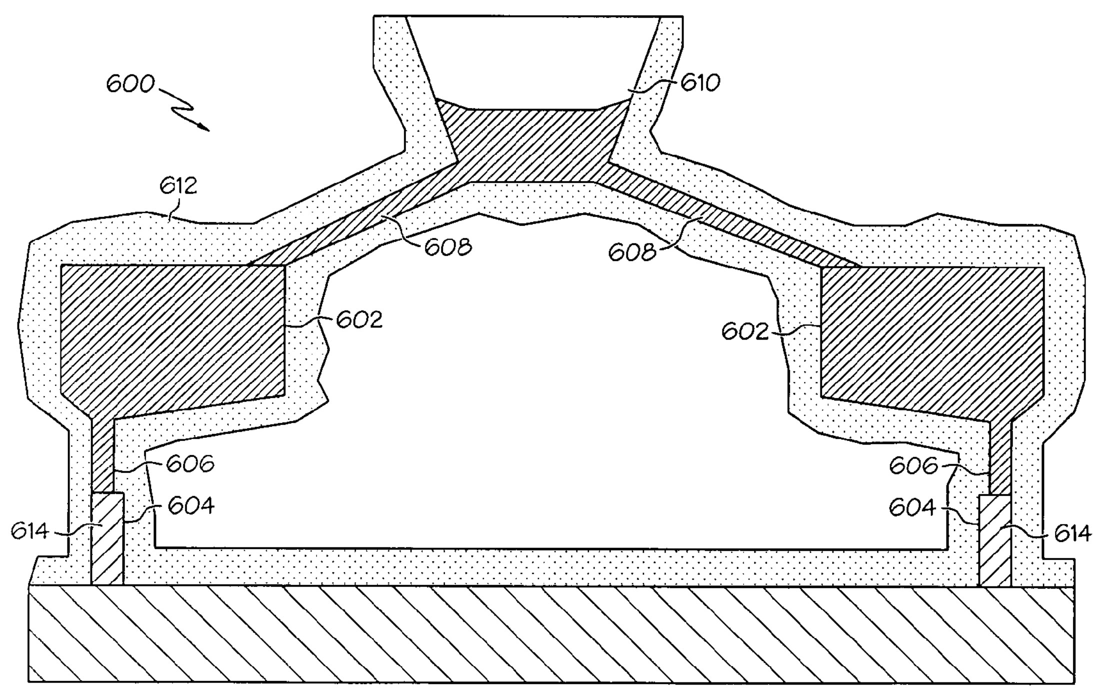
FIG. 6 is a cross section view of an investment casting mold pattern for use in the method depicted in FIG. 5, according to an embodiment.

Referring back to FIG. 3, in another embodiment of step 302, the ring may be integrally formed as in a method 500 depicted in FIG. 5. In an embodiment of method 500, an investment casting mold pattern is assembled, step 502. With additional reference to FIG. 6, a cross section view of an investment casting mold pattern during a step of method 500 is provided, according to an embodiment. The investment casting mold pattern 600 may be formed from a ring pattern 602, seed cavities 604, grain bridges 606, and gatings 608. The seed cavities 604 are configured to each receive a single seed crystal. The grain bridges 606 provide passages between the seed cavities 604 and the ring pattern 602, and the gatings 608 provide passages between the ring pattern 602 and the pour cup 610. The number of seed cavities may be equivalent to the number of arc segments that make up the ring. The mold pattern may be made from wax, plastic, or other materials conventionally used to make patterns for investment casting processes. As shown in FIG. 6, the investment casting mold pattern 600 may be maintained in a horizontal orientation during method 500, in an embodiment.

Referring also to FIG. 5, once again, after the investment casting mold pattern 600 has been assembled, a shell 612 may be deposited on the mold pattern, step 504. The shell 612 may be made of a heat resistant material, such as a heat resistant ceramic, and may be deposited by employing any suitable deposition method. For example, the heat resistant material may be a slurry and the mold pattern may be dipped into the slurry. In another embodiment, the heat resistant material may be sprayed onto the mold pattern. In any case, after the shell 612 has been deposited and dried, the mold pattern may be removed therefrom, step 506. For example, the mold pattern may be melted and burnt out of the shell 612 to remove any residue of the mold pattern.

One seed crystal 614 may be inserted into each seed cavity 604, step 508. In an embodiment, the seed crystals 614 may comprise a single crystal superalloy, such as nickel-base single crystal superalloy seed crystals. Each seed crystal 614 may be oriented to define predetermined primary and secondary crystallographic orientations of the arc segment. In an embodiment, the predetermined primary orientation may be selected so that a radial direction of the ring 104 (FIG. 1) has the same orientation as that of a blade to be attached thereto. For example, both the ring 104 and the blade may have a primary orientation of [100]. In another embodiment, the predetermined secondary orientation of the seed crystal may be the same as that of a single crystal blade attachment to be attached to the ring. Although reference to one seed crystal is made above, it will be appreciated that more may alternatively be used, depending on the total number of seed cavities 604 that make up the mold pattern. For example, the mold pattern may include 24 to 72 seed cavities 604; thus, 24 to 72 seed crystals may be used to form the arc segments.

Next, the investment casting mold assembly is prepared for investment casting, step 510. In an embodiment, the investment casting mold assembly may be placed onto a chill plate 616. The chill plate 616 may be water cooled. In another embodiment, the investment casting mold assembly may be placed into a protective environment, for example, a vacuum chamber. In still another embodiment, the investment casting mold assembly may be heated. For example, the assembly may be positioned in a mold heater (not shown), such as a furnace. In this regard, the portion of the assembly not in contact with the chill plate 616 may be preheated to a predetermined temperature above the liquidus temperature of a seed crystal material in the assembly (e.g., the superalloy), while another portion of the assembly containing the seed crystals that is attached to the chill plate 616 may be maintained at a temperature below the solidus temperature of the seed crystal material. The predetermined temperature may be in a range of between about 25° C. to 200° C. above the liquidus temperature of the material from which the ring is made, in an embodiment.

The ring is then formed, step 512. In an embodiment, a single crystal superalloy material is first melted and then poured into the mold assembly. For example, the single crystal superalloy material may be deposited into a crucible, or other suitable container, and the material is heated to a temperature above the liquidus temperature thereof. In an embodiment, the material may be heated to a temperature in a range of between about 25° C. and 200° C. above its liquidus temperature. In other embodiments, the heating temperature may be higher or lower. The single crystal superalloy material may be melted using an induction heating coil, in an embodiment. The coil may be used to stir the material as it melts.

The molten superalloy material may then be poured into the investment casting mold assembly through the pour cup 610 to form a casting. In an embodiment, after the molten material is poured into the pour cup 610, the investment casting mold assembly may be removed vertically out of the mold heater (not shown), which may result in a moving thermal gradient that enables directional solidification of the casting. Directional solidification in the gradient may enable the seed crystals 614 to grow into the cavities making up the ring pattern 602. After the casting has cooled, it may next be removed from the protective environment and from the investment casting mold assembly.

As the grains nucleated by the seed crystals grow into the cavities making up the ring pattern 602, they eventually bond together to thereby form the ring. The bonded ring includes bond lines therebetween. In an embodiment, adjacent grains in the ring have a low-angle grain boundary therebetween with a predetermined crystallographic mismatch across the bond lines. An acceptable angle of crystallographic mismatch across a bond line may be determined by dividing 360° by n, where n is the total number of arc segments of the ring. For example, the crystallographic mismatch may be an angle within a range of between about 6 degrees and about 18 degrees. In other embodiments, the mismatch may be about 10 degrees. In still other embodiments, the mismatch may be greater or less. No matter the nominal mismatch between arc segment grains within the ring, the angles of crystallographic mismatch between adjacent grains within the ring may vary by between about ±4°.

Returning to FIG. 3, the ring is bonded to a hub to form a dual alloy turbine disk, step 304. The hub may be made by a conventional process, such as by powder metallurgy. In an embodiment, as mentioned above, the hub may comprise a material that is different from the material from which the ring is made. For example, the hub may be made of a nickel-based alloy formulated to withstand higher stresses and temperatures lower than those to which the ring will be subjected. In this regard, the hub may be made of an equiaxed superalloy material, which may be formed from Alloy 10, Astroloy, or U720, to name a few.

The ring and the hub may be dimensioned such that a bond line is formed at a location where exposure to temperatures may not exceed about 675° C. In this regard, an inner diameter of the ring may be machined to a particular dimension before being bonded to the hub, and an outer peripheral surface of the hub may be machined to a particular dimension to improve bonding to the ring. For example, in an embodiment where the ring is shrink fit onto the hub, the inner diameter of the ring may be machined so as to be slightly less than an outer diameter of the hub. In another embodiment, the inner diameter of the ring may be substantially equal in size to the outer diameter of the hub.

In any case, the ring may be bonded to the hub using any one of numerous conventional processes. For example, the ring may be bonded to the hub using heat and pressure. In still another example, the ring may be shrink-fitted to the hub, evacuated and the joined surfaces sealed, and bonding may occur using a hot isostatic pressure process. For example, the hot isostatic pressing process parameters may include pressure, temperature, and time. In an embodiment, the hot isostatic pressing process may be performed at parameters where a selected temperature is in a range of between about 1090° C. and 1290° C. and a selected pressure is in a range of between about 15 to 30 ksi. The process may be performed for between about 2 to 8 hours. In another embodiment, the hot isostatic pressing process may be performed at a temperature within a range of between about 1140° C. to 1260° C. at a pressure in a range of between about 20 to 30 ksi for between about 2 to 6 hours.

After bonding, the disk may be subjected to a heat treatment. In an embodiment, the heat treatment may occur at temperatures below the bonding temperature of the ring and the hub.

Next, slots may be formed in the disk, step 306. In an embodiment, at least a portion of the bond lines between the arc segments is removed to thereby form a slot. For example, an outer periphery of the disk and a portion of the disk extending radially inwardly therefrom may be machined to remove the bond lines therefrom. As a result, the machined disk posts may be substantially single crystal, which may minimize scatter in creep life and low cycle fatigue strength.

The number of slots included in the disk may be substantially equal to a number of arc segments that make up the disk. In an embodiment, the number of slots may be in a range of between about twenty-four (24) slots and about forty-eight (48) slots. More or fewer slots may be included in other embodiments. The slots are formed to receive corresponding attachments of blades. For example, the slots may be machined to receive fir-tree shaped or dove-tail shaped blade attachments.

The blades may be inserted into the disk, step 308. The blades each may be substantially identical in material and configuration, in an embodiment. In any case, however, as mentioned above, each single crystal blade may have a predetermined primary orientation and a predetermined secondary orientation and is capable of withstanding temperatures within a predetermined range. Additionally, each predetermined primary orientation of each blade may be substantially equal, and each predetermined secondary orientation of each blade may be substantially equal. The predetermined range may include temperatures between about 675° C. and about 1150° C. Suitable materials capable of having the aforementioned properties include, but are not limited to SC180.

The blades may be inserted into the ring such that the predetermined primary and secondary orientations of a single crystal blade may be substantially equal to the predetermined primary and secondary orientation of adjacent portions of the ring (e.g., corresponding posts), according to an embodiment. In this way, the blades and adjacent portions of the ring may be substantially similar in modulus, which may reduce fatigue stresses as compared to adjacent components having different primary and secondary orientations. Thus, as long as adjacent portions of the two components have the same crystallographic orientation, the blades may or may not be made of material that is substantially identical to that of the ring. In other embodiments, the blades may not have substantially equal predetermined primary and secondary orientation as those of adjacent portions of the ring. In other embodiments, the blades may have an equiaxed or directionally solidified columnar grained microstructure.

A bladed disk has now been provided that may be improved over conventional bladed disks. In particular, the above-described bladed disk may be more capable of operating at disk rim temperatures greater than 675° C., with acceptable creep strength and low cycle fatigue strength, relative to conventional equiaxed superalloy disks.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of manufacturing a turbine component, the method comprising the steps of:

forming a plurality of arc segments, each arc segment comprising a single crystal material having a predetermined primary orientation and a predetermined secondary orientation, each predetermined primary orientation of each arc segment being substantially equal, and each predetermined secondary orientation of each arc segment being substantially equal;

bonding the plurality of arc segments together into a ring such that each arc segment is adjacent another arc segment, the adjacent arc segments have a bond line therebetween, and the adjacent arc segments have a predetermined crystallographic mismatch therebetween;

bonding the ring to a hub to form a disk; and machining the disk to remove at least a portion of the bond line between adjacent arc segments to thereby form a slot in the disk to form the turbine component.

2. The method of claim 1, wherein the step of forming comprises growing each arc segment from a seed crystal.

3. The method of claim 2, wherein the seed crystal comprises a nickel-based superalloy.

4. The method of claim 1, wherein the step of bonding the plurality of arc segments comprises positioning the plurality of arc segments such that the predetermined crystallographic mismatch between adjacent arc segments is an angle between about 6 degrees and about 18 degrees.

5. The method of claim 1, wherein the plurality of arc segments comprises a first arc segment and a second arc segment and the step of bonding the plurality of arc segments comprises:

depositing a transient liquid phase material on a bonding surface of the first arc segment and a bonding surface of the second arc segment;

loading the plurality of arc segments into a thermal expansion tooling; and heating the plurality of arc segments to melt a melting point depressant in the transient liquid phase material and to thereby bond the plurality of arc segments together into the ring and to compress the plurality of arc segments.

6. The method of claim 1, wherein the plurality of arc segments comprises a first arc segment and a second arc segment and the step of bonding the plurality of arc segments comprises:

depositing a transient liquid melting point depressant on a bonding surface of the first arc segment and a bonding surface of the second arc segment;

loading the plurality of arc segments into tooling that places the bonding surfaces of the arc segments into compression; and heating adjacent arc segments to melt a melting point depressant in the transient liquid phase material and to thereby bond the plurality of arc segments together into the ring.

7. The method of claim 1, wherein the step of bonding the plurality of arc segments comprises:

inserting a superalloy foil between the bonding surfaces of adjacent arc segments, the superalloy foil including a transient liquid phase material thereon;

loading the plurality of arc segments into a thermal expansion tooling; and heating the plurality of arc segments to melt the transient liquid phase material to thereby bond and compress the plurality of arc segments together into a ring.

8. The method of claim 1, wherein the step of bonding the plurality of arc segments comprises:

arranging the plurality of arc segments into an investment casting mold;

preheating the investment casting mold and the plurality of arc segments to a temperature of about 1100° C.±100° C.; and casting a molten bonding alloy into a gap between bonding surfaces of at least two adjacent arc segments of the plurality of arc segments.

9. The method of claim 1, wherein the step of bonding the plurality of arc segments comprises:

arranging the plurality of arc segments into casting tooling;

preheating at least two adjacent arc segments of the plurality of arc segments to a temperature of about 1100° C.±100° C.;

casting a molten bonding alloy into a gap between a bonding surface of each arc segment of the at least two adjacent arc segments; and repeating the preheating and casting steps until all arc segments are bonded into a ring.

10. The method of claim 1, wherein the step of bonding the ring to the hub comprises subjecting the ring and the hub to a hot isostatic pressing process.

11. The method of claim 1, further comprising inserting a turbine blade into the slot in the disk.

12. A method of manufacturing a turbine component, the method comprising the steps of:

integrally casting a ring having a plurality of arc segments grown from a plurality of seed crystals, each arc segment comprising a single crystal material having a predetermined primary orientation and a predetermined secondary orientation, each predetermined primary orientation of each arc segment being substantially equal, and each predetermined secondary orientation of each arc segment being substantially equal, each arc segment adjacent another arc segment and having a bond line therebetween, and the adjacent arc segments having a predetermined crystallographic mismatch therebetween;

bonding the ring to a hub to form a disk; and machining the disk to remove at least a portion of the bond line between adjacent arc segments to thereby form a slot in the disk to form the turbine component.

13. The method of claim 12, wherein the step of integrally casting comprises forming each arc segment from at least one nickel-base superalloy seed crystal.

14. The method of claim 12, wherein the step of integrally casting comprises forming the arc segments from between about 24 and about 72 seed crystals.

15. The method of claim 12, wherein the step of bonding comprises subjecting the ring and the hub to a hot isostatic pressing process.

16. The method of claim 12, further comprising inserting a turbine blade into the slot of the disk.

17. A turbine component comprising:

a hub comprising a first material;

a ring bonded to the hub, the ring comprising a plurality of arc segments, each arc segment comprising a second material comprising a single crystal material having a predetermined primary orientation and a predetermined secondary orientation, each predetermined primary orientation of each arc segment being substantially equal, and each predetermined secondary orientation of each arc segment being substantially equal, each arc segment adjacent another arc segment, and the adjacent arc segments having a predetermined crystallographic mismatch therebetween, the ring having a plurality of slots therein; and a plurality of blades inserted into corresponding plurality of slots, each blade comprising a material having a predetermined primary orientation and a predetermined secondary orientation, each predetermined primary orientation of each blade being substantially equal, each predetermined secondary orientation of each blade being substantially equal, and each predetermined primary orientation and a predetermined secondary orientation of each blade being substantially equal to an adjacent arc segment.

18. The turbine component of claim 17, wherein the hub comprises an equiaxed superalloy material.

19. The turbine component of claim 17, wherein the ring comprises a nickel-based superalloy material.

* * * * *